United States Patent [19]

Caldwell et al.

[11] Patent Number: 4,608,220
[45] Date of Patent: Aug. 26, 1986

[54] METHOD OF FORMING COMPOSITE MATERIAL ARTICLES

[75] Inventors: John E. Caldwell, Kent; Michael R. Chapman, Federal Way; Kenneth J. Goodwin, Seattle; Patrick A. Lowery, Auburn, all of Wash.

[73] Assignee: The Boeing Company, Seattle, Wash.

[21] Appl. No.: 684,245

[22] Filed: Dec. 20, 1984

[51] Int. Cl.⁴ .................. B29C 43/10; B29C 43/14; B29C 43/20

[52] U.S. Cl. .................. 264/510; 264/512; 264/552; 264/258; 264/294; 264/314; 264/316; 425/342.1; 425/347; 425/389

[58] Field of Search .............. 264/510, 512, 552, 571, 264/294, 316, 314, 258, 313; 425/342.1, 343, 389

[56] References Cited

U.S. PATENT DOCUMENTS

| | | | |
|---|---|---|---|
| 2,655,710 | 10/1953 | Roensch et al. | 25/154 |
| 2,838,435 | 6/1958 | Hewett | 154/110 |
| 2,937,401 | 5/1960 | Amos | 18/5 |
| 3,128,322 | 4/1964 | Young | 264/314 |
| 3,372,820 | 3/1968 | Barnett | 264/310 |
| 3,546,740 | 12/1970 | Johnson | 18/19 |
| 3,614,811 | 10/1971 | Johnson | 18/19 |
| 3,642,975 | 2/1972 | Duggins et al. | 264/314 |
| 3,655,863 | 4/1972 | Andersen et al. | 264/294 |
| 3,663,682 | 5/1972 | Nitta et al. | 264/310 |
| 3,822,980 | 7/1974 | Graeper | 425/429 |
| 3,827,682 | 8/1974 | Foster, Sr. et al. | 269/8 |
| 3,847,631 | 11/1974 | MacMillan | 156/96 |
| 3,873,399 | 3/1975 | Goldsworthy et al. | 156/441 |
| 3,937,781 | 2/1976 | Allen | 264/314 |
| 4,126,655 | 11/1978 | Virtanen | 264/71 |
| 4,247,279 | 1/1981 | Masters | 425/430 |
| 4,267,142 | 5/1981 | Lankheet | 264/316 X |
| 4,330,247 | 5/1982 | Folschweiler | 264/316 X |
| 4,381,170 | 4/1983 | Orii | 414/758 |
| 4,385,955 | 5/1983 | Poerfling et al. | 264/258 X |

FOREIGN PATENT DOCUMENTS

| | | | |
|---|---|---|---|
| 51-10873 | 1/1976 | Japan | 264/294 |

Primary Examiner—Jan Silbaugh
Attorney, Agent, or Firm—Joan H. Pauly

[57] ABSTRACT

Improvements in manufacturing composite material articles. The use of male molds in forming such articles has the problem of requiring large tolerances for the outer dimensions of the articles. The use of female molds has the problem of inaccurate forming of highly contoured inner surfaces. The invention produces an accurately formed inner surface by molding material against a male mold, and outer dimensions within close tolerances by curing the material in a female mold. A male caul (34) is positioned on a male mold (30). A preplied stack (32) of composite material is supported on a blanket (36) and held in position against caul (34) with caul (34) and mold (30) in an inverted position. Stack (32) is heated. A vacuum causes blanket (36) to mold stack (32) against caul (34). Mold (30) is rotated 180°, and stack (32) is allowed to cool. A female mold surface (43) is placed into contact with formed stack (32). Male mold (30) is moved away, leaving caul (34) and formed stack (32) in female mold (42). Stack (32) is cured in female mold (42), preferably by a vacuum bagging operation.

18 Claims, 22 Drawing Figures

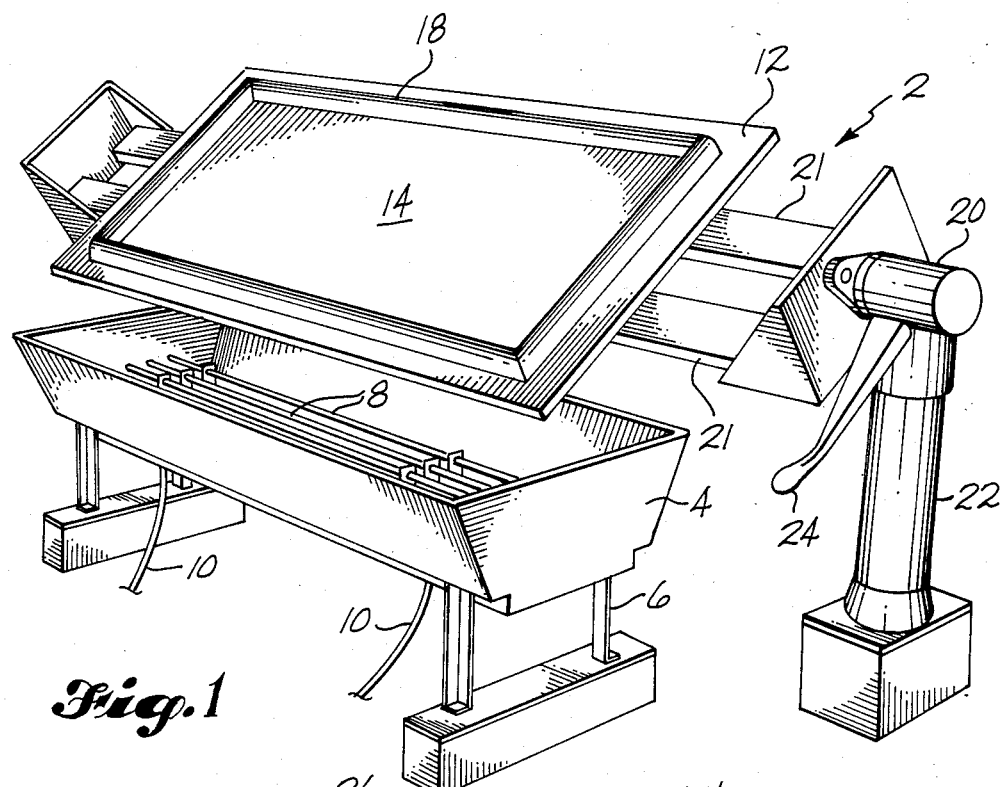
*Fig.1*
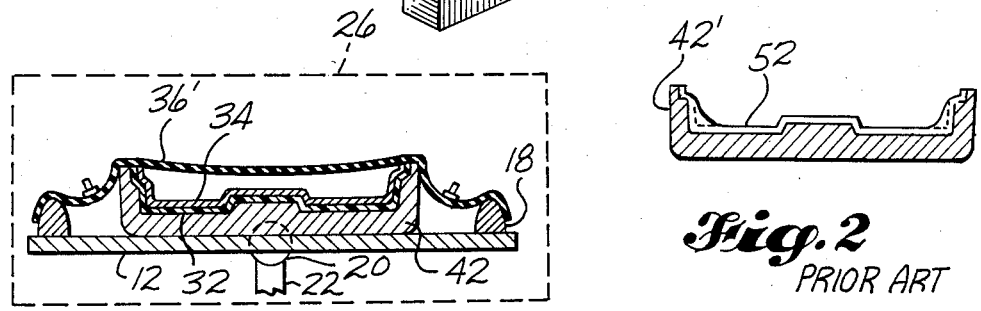
*Fig.16*
*Fig.2* PRIOR ART
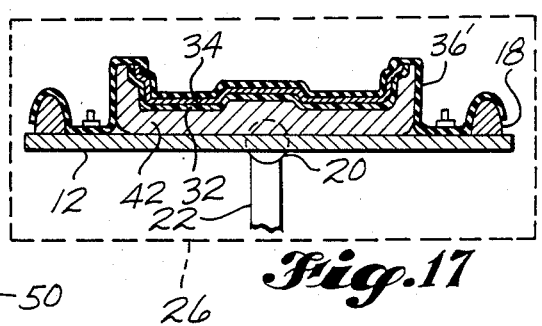
*Fig.17*
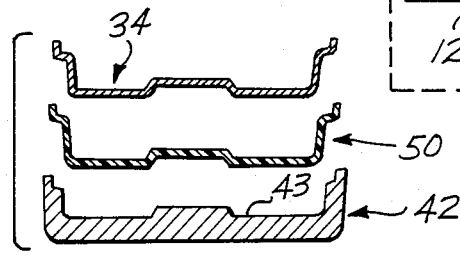
*Fig.18*

METHOD OF FORMING COMPOSITE MATERIAL ARTICLES

DESCRIPTION

1. Technical Field

This invention relates to methods of forming composite material articles and, more particularly, to such a method in which a preplied stack of composite material is first formed on a male mold to obtain accurate forming of highly curved inner surfaces and then is cured in a female mold to accurately control the outer dimensions of the article.

2. Background Art

In an aircraft, there are a large number of parts that have compoundly curved surfaces. Some of these parts are made from fiber reinforced/resin matrix composite materials. It is generally expected that in the future more and more aircraft parts will be made from such materials. Therefore, there is a great deal of interest in improving methods of production of compoundly contoured composite material parts to make the use of composite materials for a growing number of parts economical. The methods that are presently in use in the production of compoundly contoured composite material parts generally have the serious disadvantages of being very slow, very labor intensive, and thus very expensive to carry out.

Present methods of fabricating such composite material parts include a time consuming, labor intensive ply-by-ply hand lay-up process. Each individual ply of composite material is laid onto a lay-up tool, and then is formed by hand around the contours of the lay-up tool. The hand forming of each ply generally involves the application of heat to the area being worked and the meticulous hand working of the material to eliminate any wrinkles. After being formed, each ply must be individually compacted to remove any entrapped air. Since each part may be made up of dozens of individual plies of composite material, the total number of hours required to form and compact the part can easily make the fabrication process, and thus the finished part, prohibitively expensive.

A possible solution to the problem of reducing the cost of the production of the part would be to first preply the composite material into stacks of two or more plies and then to form the preplied stacks. This would reduce the total time and labor required in the forming process. However, attempts at forming composite material parts in this manner have been generally unsuccessful. Attempts at forming the preplied stacks at room temperature have been particularly unsuccessful. The preplied stacks have consistently wrinkled, regardless of how much hand forming is attempted, because of the viscous nature of the resin matrices of the composite materials.

Attempts to remedy the problem of wrinkling by applying heat to the preplied stacks have reduced wrinkling but have presented difficulties in controlling the forming process. This new problem of control is a result of the viscosity of the resin matrices decreasing as the material is heated. With the heated material unsupported, it is very difficult to control the position and rate of forming of the material. Another problem encountered in the forming of heated preplied stacks using conventional methods is the uneven heating of the inner and outer heated plies in a thick stack. The outer heated plies are subject to a rapid loss of stiffness and thus tend to form prematurely. At the same time, the inner plies remain insufficiently heated and wrinkle because they are not ready for forming.

A system for forming multiple plies of composite material that have been heated is set forth in copending U.S. patent application Ser. No. 639,846, filed Aug. 13, 1984, in the name of Marlow C. Anderson. In the Anderson system, the composite material is placed on a flexible membrane and heated by contact with the membrane. Fluid pressure is then used to move the membrane upwardly toward a male mold surface to form the material against the mold surface. The mold and the membrane are rotated 180° to position the mold under the membrane before the fluid pressure is removed and the membrane is allowed to move out of contact with the composite material. The mold and the composite material are then placed in an autoclave for curing.

Another problem associated with forming composite material parts with compound contours is the difficulty in obtaining accurate forming of highly contoured inner surfaces, such as inner surfaces with very tight radii, and at the same time maintaining the outer dimensions of the part within very close tolerances. Forming a part in a female mold makes it possible to meet close tolerances for the outer dimensions, as compared to forming the material on a male mold, but there is a tendency for the material to bridge across inner surfaces having tight radii. This bridging results in the inaccurate forming of the inner surface. Use of a male mold results in more accurate forming of inner surfaces having tight radii, but this is accomplished at the expense of requiring significantly greater tolerances for the outer dimensions of the part as compared to the tolerances that can be maintained using a female mold.

The patent literature includes a variety of systems for forming and molding various types of material. U.S. Pat. Nos. 3,546,740 and 3,614,811, granted Dec. 15, 1970, and Oct. 26, 1971, respectively, to H. G. Johnson, and U.S. Pat. No. 3,642,975, granted Feb. 15, 1972, to R. B. Duggins et al disclose systems in which a membrane is expanded into contact with a female mold surface to form a material against such surface. Each of the following U.S. patents discloses a system in which a bag is expanded inside a female mold to form and/or cure material inside the female mold: U.S. Pat. Nos. 2,838,435, granted June 10, 1958, to O. C. Hewett; 2,937,401, granted May 24, 1960, to H. Amos; 3,847,631, granted Nov. 12, 1974, to K. T. MacMillan; and 3,937,781, granted Feb. 10, 1976, to P. E. Allen. A process in which an inflated bag is lowered over a rounded male mandrel to form a fibrous material impregnated with resin against the mandrel and squeeze air and excess resin out of the material is disclosed in U.S. Pat. No. 3,128,322, granted Apr. 7, 1964, to R. E. Young.

The patent literature also includes a number of examples of systems in which goods are rotated during the process of their manufacture. U.S. Pat. Nos. 2,655,710, granted Oct. 20, 1953, to B. Roensch et al, and 4,126,655, granted Nov. 21, 1978, to P. E. E. Virtanen each disclose a method of making concrete articles in which concrete is placed in a mold and the mold and the concrete are rotated 90° to 180° at the end of the molding process. There are also a number of patents relating to systems for molding thin-walled plastic articles by placing the material to be molded inside a heated female mold and rotating the mold to cause the material to be formed against the walls of the mold by centrifugal force. Such systems are disclosed in U.S. Pat. Nos. 3,372,820, granted Mar. 12, 1968, to L. H. Barnett; 3,663,682, granted May 16, 1972, to H. Nitta et al; 3,822,980, granted July 9, 1974, to M. R. Graeper; and 4,247,279, granted Jan. 27, 1981, to W. E. Masters. A system for forming elongated reinforced plastic articles, in which plastic material and movable die sections rotate past fixed die sections during forming and during curing, is disclosed in U.S. Pat. No. 3,873,399, granted Mar. 25, 1975, to W. B. Goldsworthy et al. Other systems of manufacture in which the article being manufactured is rotated during the process are disclosed in U.S. Pat. Nos. 3,827,682, granted Aug. 6, 1974, to C. J. Foster, Sr. et al, and 4,381,170 granted Apr. 6, 1983, to M. Orii.

The systems and patents described above, together with the prior art cited in the patents, should be carefully considered for the purpose of putting the present invention into proper perspective relative to the prior art.

DISCLOSURE OF THE INVENTION

The subject of this invention is a method of manufacturing an article from a plastic material. According to an aspect of the invention, the method comprises providing a male mold that has a male mold surface with a desired shape, and forming the plastic material onto this mold to conform the material to such shape. A female mold is also provided. The female mold has a female mold surface with a shape and dimensions essentially identical to the desired shape and dimensions of the outer surface of the completed article. The female mold surface is placed into contact with the formed material on the male mold. The formed material is cured in the female mold. The curing step includes exerting essentially uniform pressure on the material to urge it against the female mold surface.

The combination of forming the material on a male mold surface and then curing the material in a female mold solves the problems discussed above in connection with the difficulties encountered in attempting to accurately form highly contoured inner surfaces while maintaining outer dimensions within close tolerances. The initial forming on the male mold accurately defines the contours and tight radii of the inner surfaces, and the curing of the material in a female mold ensures that the outer dimensions are maintained within close tolerances. Thus the advantages of using a male mold and the advantages of using a female mold are both achieved while avoiding the corresponding disadvantages of each type of mold.

The curing step may be carried out in a number of ways. Preferably, the curing step includes placing a flexible blanket over the female mold and exerting such essentially uniform pressure at least in part by applying a vacuum between the blanket and the female mold. In the preferred embodiment, the curing step further includes placing into an autoclave the female mold with the formed material therein. The material is heated inside the autoclave while such pressure is being exerted. The pressure on the material is provided by applying the vacuum and by maintaining an elevated pressure inside the autoclave, while applying the vacuum, to urge the blanket toward the female mold.

A preferred feature of the invention is the heating of the material to reduce its viscosity during the forming step. A flexible blanket is placed adjacent to the material opposite the male mold. After the material is heated, a vacuum is applied between the blanket and the male mold to pull the blanket toward the male mold and in turn form the material against the male mold. The invention is directed primarily toward methods in which the material formed comprises a plurality of plies of composite material, each such ply including a thermoplastic resin matrix reinforced with a fibrous material. When such a material is being formed, the application of heat reduces the viscosity of the resin matrices. When the vacuum is applied to pull the blanket toward the male mold and form the composite material, the fibrous material slips within the matrices and the plies slip with respect to each other, to form the composite material accurately and without wrinkling.

According to a preferred aspect of the invention, the method comprises providing a male mold that has a male mold surface with a desired shape and also providing a male caul that conforms to such shape. The caul is positioned on the mold in contact with the male mold surface. The plastic material is formed onto the caul positioned on the mold to conform the material to the desired shape. The method also includes providing a female mold that has a female mold surface with a shape and dimensions essentially identical to the desired shape and dimensions of the outer surface of the completed article. The female mold surface is placed into contact with the formed material on the caul and the male mold. The male mold is moved away from the caul, and the formed material and the caul are left in the female mold. The formed material is cured in the female mold between the caul and the female mold surface. The curing includes exerting pressure on the caul to exert essentially uniform pressure on the material and urge the material against the female mold surface.

The use of the caul in the method has two major functions. The first, and perhaps the most important, function is to greatly facilitate the transfer of the formed material from the male mold to the female mold. The caul allows the transfer to be made quickly and with minimum effort. Thus, the advantages discussed above of using a combination of forming on a male mold and curing in a female mold may be easily achieved while maintaining the simplicity and efficiency of the manufacturing process. The other major function of the caul is to ensure that the finished article has a high quality inner surface. This function is particularly important with respect to articles having inner surfaces with tight radius configurations. During curing, the caul ensures good contact with the inner surface of the material and the maintenance of essentially uniform pressure on the material. In other words, the caul distributes the pressure to ensure that each portion of the material is subjected to essentially the same amount of pressure. The even pressure helps to ensure even compaction and, thus, a high quality finished article.

Preferably, the method further comprises exerting pressure on the female mold to urge the female mold surface against the formed material. This is done after placing the female mold surface into contact with the formed material and before moving the male mold away from the caul. The exertion of pressure on the female mold facilitates the subsequent steps of the method, in particular the moving of the male mold away from the caul and the leaving of the caul and the formed material in the female mold. In addition, the urging of the female mold surface gainst the formed material helps to ensure that there is good contact between the material and the female mold surface so that the outer contours and dimensions of the finished article will accurately conform to the contours and dimensions of the female mold surface and, thus, be within close tolerances specified for the finished article. In the preferred embodiment, the step of exerting pressure on the female mold comprises placing a flexible blanket against the female mold opposite the male mold. A vacuum is applied between the blanket and the female mold to urge the blanket against the female mold and in turn urge the female mold surface against the formed material.

The preferred embodiment of the forming step includes forming the material with the male mold in an inverted position. This embodiment of the forming step includes positioning the male mold with the male mold surface and the caul facing generally upwardly. The material is placed on top of the caul, and a flexible blanket is placed adjacent to the material opposite the male mold. A slight vacuum is applied between the blanket and the male mold. This slight vacuum is strong enough to hold the material in place on the caul but not strong enough to significantly bend the material. While the slight vacuum is being applied, the male mold and the blanket are rotated with the caul and material therebetween. The mold and blanket are rotated about 180° to orient the male mold surface to face generally downwardly. After rotating the male mold, the material is heated to reduce its viscosity. Then a stronger vacuum is applied between the blanket and the male mold to pull the blanket toward the male mold and in turn form the heated material against the caul.

The preferred embodiment of the forming step described above has a number of advantages. The placing of the material directly on top of the caul on the male mold facilitates indexing the material relative to the mold to accurately position the material on the mold. Such accurate positioning is particularly important when the material includes a number of plies of material some of which drop off to form areas of reduced thickness of the material which areas appear as indentations in the finished article. The blanket holds the material in place to ensure that the accurate indexing is not disturbed when the mold is rotated to an inverted position. The blanket also performs the additional functions of supporting the material while it is being heated and while, after heating, it is being formed against the caul, and of moving the heated material toward the mold to form the material.

The preferred embodiment of the forming step solves the above-described problems that have been encountered in the forming of heated plies of composite material. Because the material is supported while being heated and while being formed against the mold, the difficulties of controlling the position of the material and the rate of forming of the material as the resin viscosity drops are avoided. In addition, the heating of the material while it is supported on the blanket makes it possible to ensure that the material is heated uniformly before it is formed. This avoids the problem discussed above of wrinkles forming in inner unheated plies that are not ready for forming when the outer heated plies are ready.

Preferably, after the material is formed and while the application of the stronger vacuum is continued, the male mold and the blanket are rotated about 180° to orient the male mold surface to face generally upwardly, and the formed material is allowed to cool. Then the blanket is moved away from the formed material to allow the female mold surface to be placed into contact with the formed material.

The method of the invention provides a relatively inexpensive means of quickly and efficiently forming composite material articles. The use of a combination of a male mold and a female mold for forming and curing, respectively, produces a finished article that has both a high quality inner surface and an accurately dimensioned outer surface. The preferred embodiment of the forming step avoids the problems discussed above in relation to conventional techniques. The forming may be accomplished quickly and easily without any need for hand working of the material or compacting each ply as it is laid. The compacting of each ply individually may be dispensed with because the stack of preplied material is automatically compacted by the application of a vacuum and heat during the forming step. The capability of forming a stack of plies without any hand forming and without any separate compacting steps greatly simplifies the manufacture of the article and reduces the time and labor necessary to accomplish the manufacture. In addition, the elimination of any need for hand forming makes it possible and practical to totally automate the manufacture of the article, thus further reducing the cost of the manufacturing process and of the finished article itself.

The advantages and features discussed above, as well as other advantages and features of the invention, will become apparent from the detailed description of the best mode for carrying out the invention that follows.

BRIEF DESCRIPTION OF THE DRAWINGS

In the drawings, like element designations refer to like parts throughout, and:

FIG. 1 is a pictorial view of apparatus for carrying out the preferred embodiment of the method of the invention, with the blanket and autoclave not shown.

FIG. 2 is a sectional view of a female mold and composite material formed therein by a previous method, with the desired tight radius configuration of the inner surface of the article shown in phantom and the inner surface configuration actually achieved shown in solid lines.

FIGS. 3–18 are sectional views illustrating the steps of the preferred embodiment of the method of the invention.

BEST MODE FOR CARRYING OUT THE INVENTION

Figure 3:
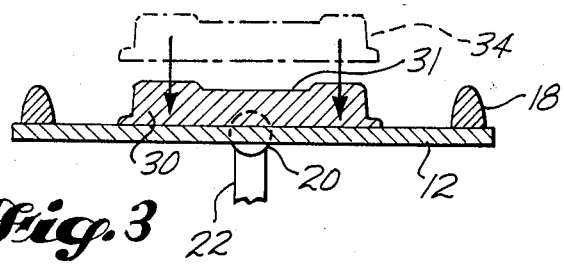

The drawings illustrate a method of manufacturing an article that is in accordance with the invention and that also constitutes the best mode of the invention currently known to the applicant. The apparatus 2 and the particular molds and preply and article configurations shown in the drawings are shown and described herein for the purpose of illustrating apparatus suitable for practicing the preferred embodiment of the invention and typical articles that may be manufactured to great advantage using the method of the invention. It is of course to be understood that other apparatus may be used to practice the method of the invention and that a wide variety of other articles may be manufactured using the method of the invention without departing from the spirit and scope of the invention.

The apparatus 2 shown in FIG. 1 includes a rotatable mold support 12 positioned above an upwardly opening concave body 4. The body 4 is supported on four vertical members 6. Inside body 4 and facing upwardly are heating elements 8. Electric cords 10 provide power for the heating elements 8. The mold support 12 is basically a table top with a center portion 14 to which a mold may be attached. A shaft 20 with a horizontal axis is provided for rotating support 12 about such axis. Support 12 is attached to shaft 20 by means of horizontal extensions 21 carried by shaft 20. A vertical support 22 supports the shaft 20. A lever 24 is provided for manually rotating shaft 20 to in turn rotate mold support 12. This arrangement has the advantage of simplicity. It is of course to be understood that the shaft 20 could also be rotated by a variety of other means, including automated means. The top of mold support 12 which includes the center portion 14 also carries a pyramid seal 18.

The method of the invention may be used to manufacture articles from a variety of nonreinforced plastic materials and fiber reinforced/resin matrix composite materials. The term "plastic material" is used herein in a generic sense and is intended to be understood as including both nonreinforced plastics and fiber reinforced/resin matrix composite materials. The method of the invention is suitable for forming articles from virtually all currently known and proposed fiber reinforced/resin matrix composite materials. The reinforcing fibers may be carbon, the material sold under the trademark Kevlar, fiberglass, or some other material. Suitable resins to form the matrices include various epoxy resins that cure at 250° to 350° F. Suitable composite materials also have a variety of fiber orientations. For example, the fibers may have a unidirected orientation or may comprise a dual or triaxial fabric weave. The method of the invention is directed primarily toward forming stacks of multiple plies of composite materials. Each ply may have fiber members with the same orientation, or there may be changes in the orientation of the fibers from one ply to another.

The method of the invention may be used to manufacture articles with a wide variety of configurations. However, the method is most advantageous when used to manufacture parts that require fiber reinforced/resin matrix composite material to be formed over a curved surface. There are a number of such parts found in most aircraft. For example, aircraft ribs, stringers, stiffeners and spar sections generally include curved surfaces.

The method of the invention includes providing a male mold having a male mold surface with a desired shape. This desired shape is determined by the desired shape of the finished article. FIGS. 3–15 illustrate a male mold 30 having a male mold surface 31. FIGS. 19–22 illustrate a similar male mold 30' with a male mold surface 31'. The method of the invention also includes providing a male caul that conforms to the shape of the male mold surface. FIGS. 3–18 illustrate a typical male caul 34. In the method of the invention, the caul is positioned on the male mold in contact with the male mold surface. It is desirable for the caul to fit essentially exactly onto the male mold. Therefore, preferably the caul is manufactured first and then the male mold is fabricated to fit the inner surface of the caul. A suitable material for fabricating the caul is a butyl rubber having a reinforcing layer of fiberglass/epoxy or graphite/epoxy. The butyl rubber is substantially cured so that it will have the desired characteristic of being elastic but not plastic. The rubber should be hard enough to maintain the desired shape of the inner surface of the article but flexible enough to distribute pressure. The reinforcing layer of fiberglass/epoxy or graphite/epoxy serves to prevent the caul from shrinking or expanding when subjected to heat or pressure. The male mold may be made from any of a variety of suitable materials.

Figure 4:
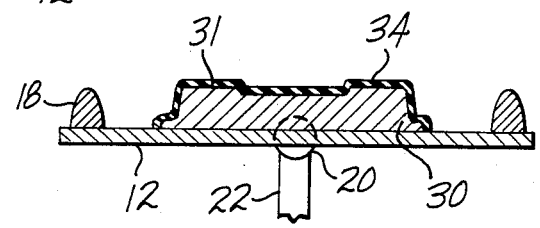

When the male mold and the caul have been provided, the caul is positioned on the mold in contact with the mold surface. FIG. 3 shows a male mold 30 in position on the mold support 12 ready to receive the caul 34. In FIG. 3, caul 34 is shown in phantom above mold 30 ready to be slipped down onto mold 30. FIG. 4 shows the caul 34 in position on mold 30.

Figure 5:
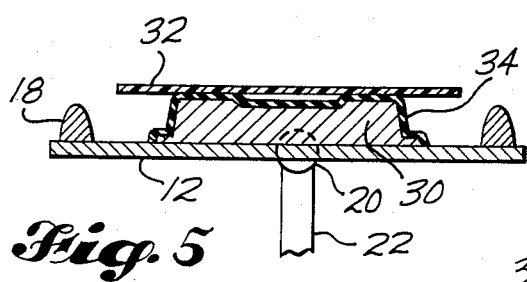
Figure 6:
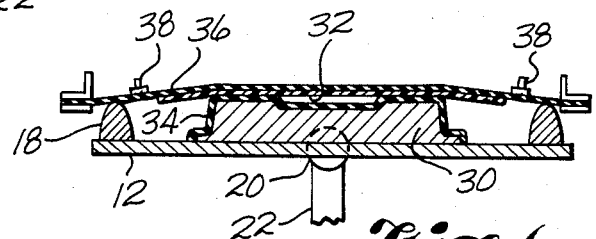
Figure 7:
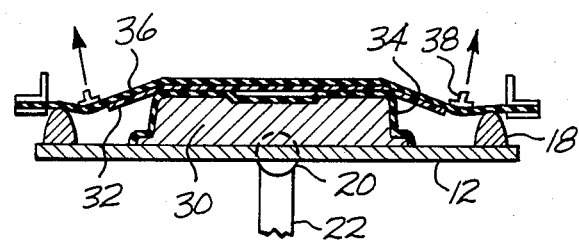
Figure 8:
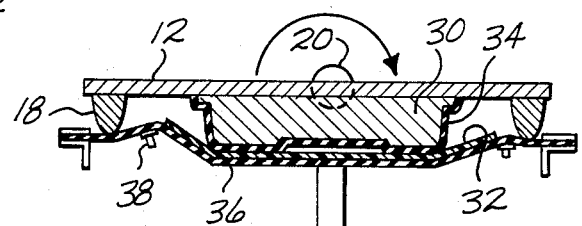
Figure 9:
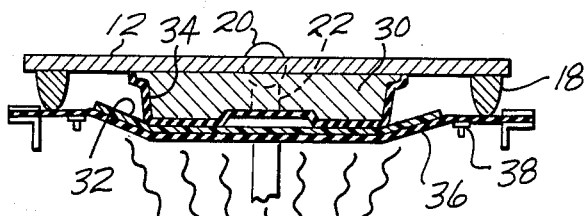

After the caul has been positioned on the male mold, a sheet of plastic material to be made into an article is formed onto the caul to conform the plastic material to the shape of the male mold surface. Referring to FIG. 4, preferably the forming of the plastic material includes positioning the male mold 30 with the male mold surface 31 and the caul 34 facing generally upwardly. With the mold 30 and caul 34 in this position, a sheet of plastic material to be made into an article is placed on top of the caul. FIG. 5 illustrates the placing of a sheet of plastic material, consisting of a preplied stack 32 of composite material, on top of the caul 34. Referring to FIG. 6, a flexible blanket 36 is placed adjacent to (i.e., on top of and parallel to) the preplied stack 32 opposite the male mold 30. Breather and/or bleeder layers of known types may be placed between the blanket 36 and the stack 32. With the stack 32 and blanket 36 in place, a slight vacuum is applied between the blanket 36 and the male mold 30. This vacuum may be applied through a variety of means, such as vacuum ports 38 shown in FIGS. 6–12. As illustrated in FIG. 7, the slight vacuum is strong enough to hold the preplied stack 32 in place on the caul 34 but not strong enough to significantly bend the stack 32. While the slight vacuum is being applied, shaft 20 is rotated to rotate the male mold 30 and the blanket 36, with the caul 34 and preplied stack 32 therebetween, about 180° to orient the male mold surface 31 to face generally downwardly. FIG. 8 illustrates the relative positions of the male mold 30 and the stack 32 at the end of the rotation. The positioning of the stack 32 under the mold 30 enables it to be supported by the blanket 36 during the subsequent heating and forming. When the laminate being formed is thick enough to be self-supporting, heating and forming may be carried out with the laminate on top of the mold 30 and rotation of the mold 30 may be eliminated.

Figure 10:
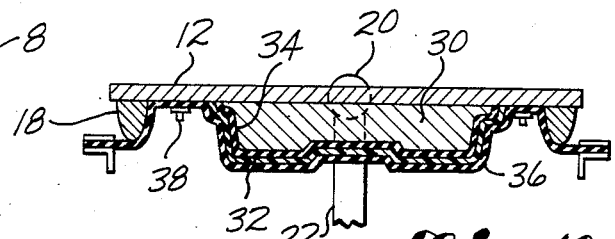

After the male mold 30 has been rotated, the preplied stack 32 is heated to reduce the viscosity of its resin matrix. The stack 32 may be heated from one side or from both sides. The latter reduces the amount of time required for heating. In the apparatus shown in FIG. 9, the heating is carried out by means of heating elements 8. The temperature of the preplied stack 32 is monitored by means of thermocouples. One of these thermocouples 40 is illustrated in FIGS. 19–22. When the stack 32 has been heated to the proper forming temperature (for example 150° F. for an epoxy resin that cures at 250° to 350° F.), a stronger vacuum is applied between the blanket 36 and the male mold 30. This stronger vacuum pulls the blanket 36 toward the male mold 30 to in turn form the heated stack 32 against the caul 34. The reduced viscosity of the heated resin of the stack 32 allows a shearing action to take place as the stack 32 is moved toward the caul 34 by the vacuum. The shearing action allows the reinforcing fibers to slip with respect to each other within the resin and also allows the plies of the stack 32 to slip with respect to each other. The result is that the stack 32 is formed accurately against the caul 34 without any wrinkling. FIG. 10 illustrates the apparatus after the space between the blanket 36 and the male mold 30 has been fully evacuated and the heated stack 32 has been formed against the caul 34.

Figure 11:
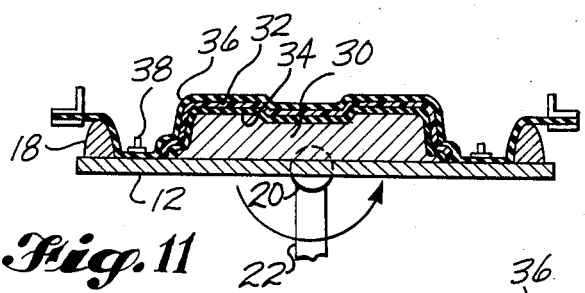
Figure 12:
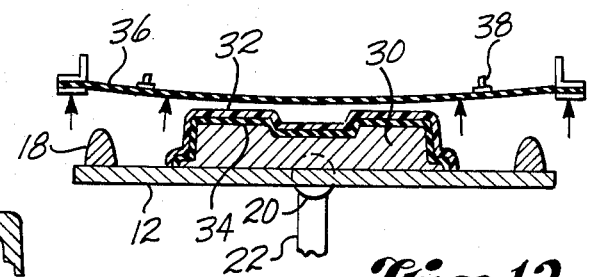

The preferred embodiment of the method of the invention includes, after forming the plastic material onto the caul and while continuing to apply the stronger vacuum, rotating the male mold 30 and the blanket 36 approximately 180° to orient the male mold surface to face generally upwardly. This may be accomplished, for example, by operating lever 24 to rotate shaft 20. FIG. 11 illustrates the rotation of the male mold 30 and the final upwardly facing position of male mold surface 31. The heated material is allowed to cool in the position shown in FIG. 11. The cooling should be sufficient to ensure that the forming of the material is not disturbed during subsequent steps of the manufacturing process. When the material is sufficiently cooled, the vacuum is released and the blanket 36 is moved away from the cooled formed material. FIG. 12 illustrates the blanket 36 being moved away from formed preplied stack 32. With the blanket 36 moved away from stack 32, a female mold surface may be brought into contact with the formed stack 32.

Figure 13:
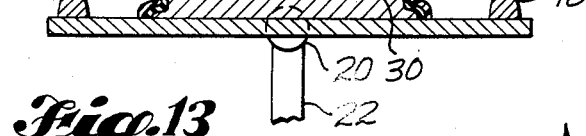
Figure 14:
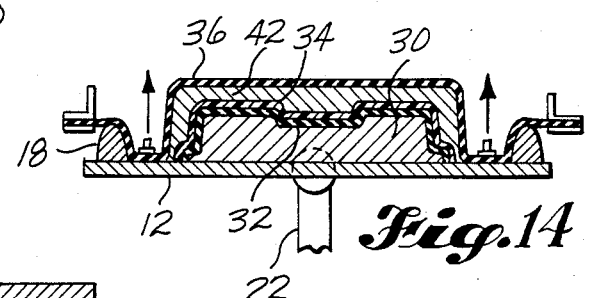

The method of the invention includes providing a female mold in which the formed material is cured. The female mold has a female mold surface with a shape and dimensions essentially identical to the desired shape and dimensions of the outer surface of the completed article. FIGS. 13-18 illustrate a female mold 42 with a female mold surface 43. Referring to FIGS. 13 and 14, when the blanket 36 has been moved away from the formed stack 32, the female mold surface 43 is placed into contact with the formed stack 32 on the caul 34 and male mold 30. FIG. 13 shows the female mold 42 positioned above the stack 32 ready to be placed into contact with the stack 32. FIG. 14 shows the female mold surface 43 in contact with stack 32.

Figure 15:
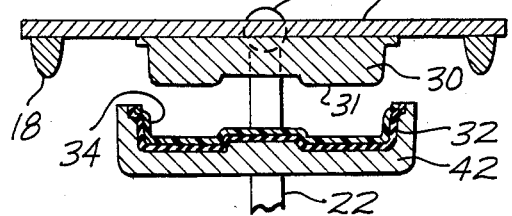
Figure 19:
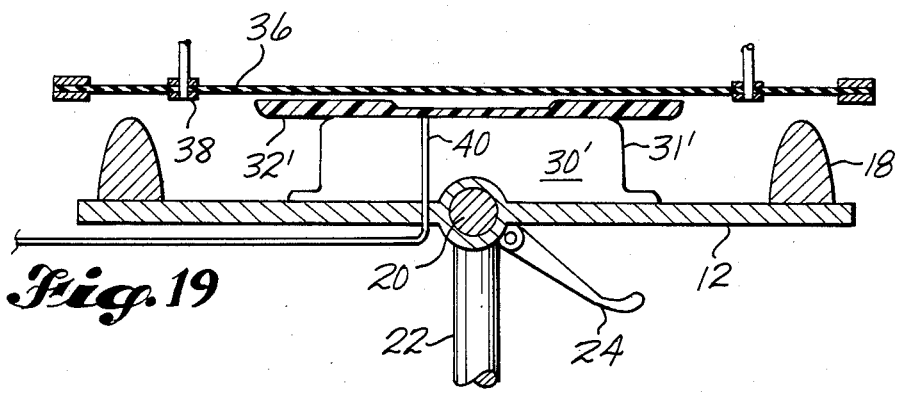
FIGS. 19–22 are sectional views illustrating the forming portion of the preferred embodiment of the invention and showing the forming of an article having walls of varying thickness.
Figure 20:
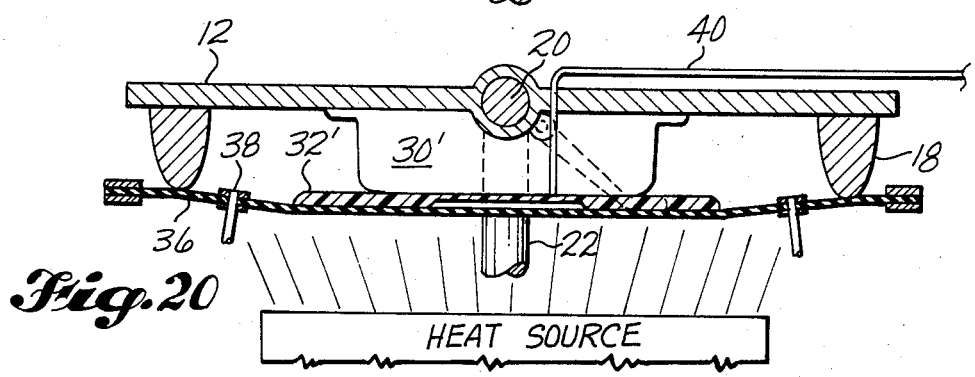
Figure 21:
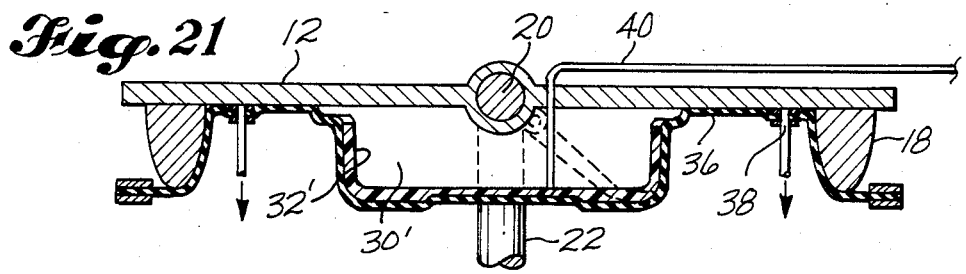

In order to ensure that there is good contact between the female mold surface 43 and the stack 32 and that the outer surface of the finished article is accurately formed, the method of the invention preferably includes applying pressure to the female mold 42 to urge it against the stack 32. The pressure applied to the female mold 42 should be as even as possible. The application of essentially even pressure may easily be accomplished by a vacuum bagging process. Such a process is illustrated in FIG. 14. With the female mold 42 in place over the formed stack 32, the blanket 36 is positioned against the upwardly directed bottom of the female mold 42 opposite the male mold 30. A vacuum is applied between the blanket 36 and the female mold 42 to urge the blanket 36 against the female mold 42 and in turn urge the female mold surface 43 against the formed stack 32. FIG. 14 illustrates this operation when the space between the blanket 36 and the female mold 42 has been fully evacuated. The urging of the female mold surface 43 against the formed stack 32 assures uniform contact between surface 43 and stack 32 and smooths out any irregularities in the surface of stack 32 adjacent to female mold surface 43. The vacuum bagging operation also facilitates the next step of moving the male mold 30 and leaving the caul 34 and the formed stack 32 in the female mold 42. FIG. 15 illustrates the step of moving the male mold 30 away from the caul 34 and formed stack 32 in female mold 42.

After the male mold 30 has been removed, the formed stack 32 is cured in the female mold 42 between the caul 34 and the female mold surface 43. The curing cycle includes exerting pressure on the caul 34 to exert essentially uniform pressure on the stack 32 and urge the stack 32 against the female mold surface 43. FIGS. 16 and 17 illustrate portions of the curing cycle. A flexible blanket 36', which depending on the details of the apparatus used to practice the method may be the blanket 36 used in the previous steps of the method or a different blanket, is placed over the female mold 42 and the caul 34. A vacuum is then applied between the blanket 36' and the female mold 42 to cause the blanket 36' to exert pressure on the caul 34. The urging of the blanket 36' against the caul 34 is turn causes the caul 34 to exert essentially uniform pressure on the formed material 32 between the caul 34 and female mold surface 43. FIG. 16 illustrates the method just after the application of the vacuum has been commenced. FIG. 17 illustrates the method when the space between the blanket 36' and the female mold 42 has been substantially completely evacuated.

The curing of the material 32 is preferably carried out in an autoclave. Such an autoclave 26 is shown schematically in broken lines in FIGS. 16 and 17. Before the vacuum is applied, the female mold 42, with the formed material 32 and the caul 34 therein, is placed into the autoclave 26. An elevated pressure is created and maintained inside the autoclave 26 to add to the force of the vacuum urging the material 32 against the female mold surface 43. The elevated pressure acts against the blanket 36' to urge the blanket 36' toward and against the caul 34, which distributes the pressure evenly against the material 32. The inside of the autoclave 26 is heated during the curing cycle and while the force of the vacuum and the elevated pressure are urging the material 32 against female mold surface 43. The combination of the heat and pressure cures the material 32. The material 32 remains in the heated autoclave 26 under pressure for a period of time. The length of this period of time depends on the particular characteristics of the resin matrix of the material 32.

When the curing cycle has been completed, the material 32 is allowed to cool and the pressure is removed from the material 32. The manufacture of the article is then complete except for finishing details, such as trimming. The untrimmed article 50 and the caul 34 are separated from the female mold 42. FIG. 18 illustrates the caul 34 and untrimmed finished article 50 separated from the mold 42.

FIGS. 19-22 illustrate the forming steps shown in FIGS. 5, 9, 10, and 12, respectively. The male mold 30' shown in FIGS. 19-22 is a variation of the male mold 30 shown in FIGS. 3-15. Mold 30' is made from a rubbery material that is sufficiently elastic to transfer pressure (during curing) but also sufficiently rigid to function properly during the forming and transfer (to the female mold) steps. Use of a mold like mold 30' makes it possible to carry out the method of the invention without providing a separate male caul and without removing the mold 30' prior to curing the material. For the purpose of better illustrating the shape of the formed material 44, such material 44 is shown separated from the male mold 30' in FIG. 22.

Figure 22:
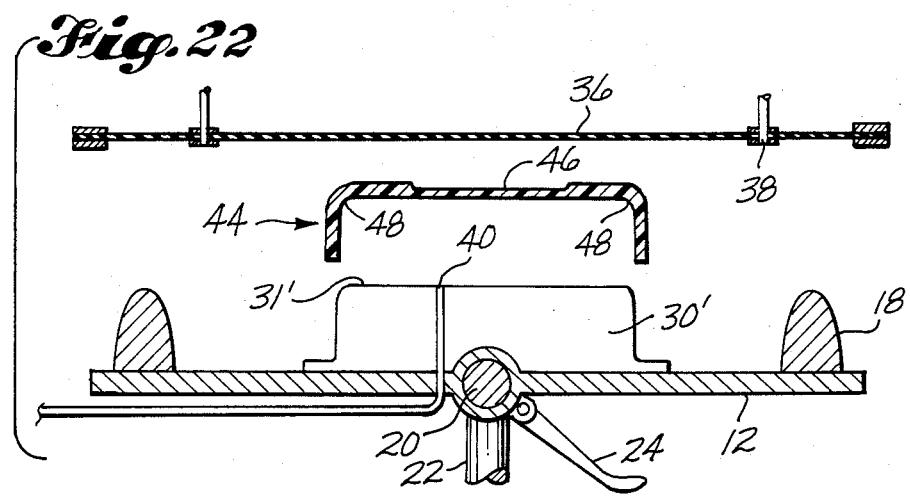

The preplied stack 32' shown being formed in FIGS. 19–22 includes a central portion having a lesser thickness than the surrounding portions. Such an indentation or area of reduced thickness is created in the preply by the dropping off of some of the plies of the stack 32'. In other words, some of the plies have an annular rather than a continuous sheet configuration. As illustrated in FIGS. 19–22, this type of preplied stack 32', as well as preplied stacks with essentially constant thicknesses, may be formed by use of the method of the invention. The dropping off of some of the plies of the stack 32' results in a formed article 44 having an indentation 46, best seen in FIG. 22. FIG. 22 also illustrates an inner surface configuration having tight radii 48. As noted above, the method of the invention is especially advantageous when used to form articles having such tight radius configurations.

For purposes of comparison, FIG. 2 shows a female mold 42' in which composite material 52 has been formed. The solid lines show the inner surface cross section actually achieved. The broken lines indicate the desired inner surface cross section. The undesirable bridging across tight radii encountered when composite material is formed in a female mold is apparent in FIG. 2. In contrast, FIGS. 18 and 22 show the absence of bridging and the high quality tight radius configuration achieved by use of the method of the invention.

It will be obvious to those skilled in the art to which this invention is addressed that the invention may be used to advantage in a variety of situations. Therefore, it is also to be understood by those skilled in the art that various changes, modifications, and omissions in form and detail may be made without departing from the spirit and scope of the invention as defined by the following claims.

What is claimed is:

1. A method of manufacturing an article from a plastic material, comprising:
   providing male mold means having a male mold surface with a shape essentially identical to the desired shape of the inner surface of the completed article;
   forming said material onto said mold means to conform said material to said shape, to accurately form the inner surface of the article;
   providing a female mold having a female mold surface with a shape and dimensions essentially identical to the desired shape and dimensions of the outer surface of the completed article, and placing the female mold surface into contact with the formed material on the male mold means;
   curing the formed material in the female mold, including exerting through flexible means essentially uniform pressure on the material to urge it against the female mold surface, to accurately control the outer dimensions of the article; and
   while placing the female mold surface into contact and curing the formed material, maintaining said shape of the inner surface of the article.

2. A method as recited in claim 1, in which the step of curing includes placing a flexible blanket over the female mold, and exerting said essentially uniform pressure includes applying a vacuum between the blanket and the female mold.

3. A method as recited in claim 2, in which the step of curing further includes placing into an autoclave the female mold with the formed material therein, and heating said material inside the autoclave while exerting said pressure; and exerting said pressure further includes, while applying said vacuum, maintaining an elevated pressure inside the autoclave to urge the blanket toward the female mold.

4. A method as recited in claim 1, in which the step of forming includes heating said material to reduce its viscosity; placing a flexible blanket adjacent to said material opposite the male mold means; and, after heating said material, applying a vacuum between the blanket and the male mold means to pull the blanket toward the male mold means and in turn form said material against the male mold means.

5. A method as recited in claim 1, in which said material comprises a plurality of plies of composite material, each such ply including a thermoplastic resin matrix reinforced with a fibrous material; and
   in which the step of forming includes heating said plastic material to reduce the viscosity of the resin matrices; placing a flexible blanket adjacent to said plastic material opposite the male mold means; after heating said plastic material, applying a vacuum between the blanket and the male mold means to pull the blanket toward the male mold means and in turn form said plastic material against the male mold means; and, while applying the vacuum, allowing the fibrous material to slip within the matrices and the plies to slip with respect to each other, to form said plastic material accurately and without wrinkling.

6. A method of manufacturing an article from a plastic material, comprising:
   providing a male mold having a male mold surface with a desired shape;
   providing a male caul that conforms to said shape, and positioning the caul on the mold in contact with said surface;
   forming said material onto the caul positioned on the mold to conform said material to said shape;
   providing a female mold having a female mold surface with a shape and dimensions essentially identical to the desired shape and dimensions of the outer surface of the completed article, and placing the female mold surface into contact with the formed material on the caul and the male mold;
   moving the male mold away from the caul, and leaving the formed material and the caul in the female mold; and
   curing the formed material in the female mold between the caul and the female mold surface, including exerting pressure on the caul to exert essentially uniform pressure on the material and urge the material against the female mold surface.

7. A method as recited in claim 6, further comprising, after so placing the female mold surface and before so moving the male mold, exerting pressure on the female mold to urge the female mold surface against the formed material to facilitate so moving the male mold and leaving the caul and the formed material in the female mold.

8. A method as recited in claim 7, in which the step of exerting pressure on the female mold comprises placing a flexible blanket against the female mold opposite the male mold, and applying a vacuum between the blanket and the female mold to urge the blanket against the female mold and in turn urge the female mold surface against the formed material.

9. A method as recited in claim 6, in which the step of forming includes heating said material to reduce its viscosity; placing a flexible blanket adjacent to said material opposite the male mold; and, after heating said material, applying a vacuum between the blanket and the male mold to pull the blanket toward the male mold and in turn form said material against the caul.

10. A method as recited in claim 9, further comprising, after so placing the female mold surface and before so moving the male mold, exerting pressure on the female mold to urge the female mold surface against the formed material to facilitate so moving the male mold and leaving the caul and the formed material in the female mold.

11. A method as recited in claim 10, in which the step of exerting pressure on the female mold comprises placing a flexible blanket against the female mold opposite the male mold, and applying a vacuum between the blanket and the female mold to urge the blanket against the female mold and in turn urge the female mold surface against the formed material.

12. A method as recited in claim 6, in which said material comprises a plurality of plies of composite material, each such ply including a thermoplastic resin matrix reinforced with a fibrous material; and in which the step of forming includes heating said plastic material to reduce the viscosity of the resin matrices; placing a flexible blanket adjacent to said plastic material opposite the male mold; after heating said plastic material, applying a vacuum between the blanket and the male mold to pull the blanket toward the male mold and in turn form said plastic material against the caul; and, while applying the vacuum, allowing the fibrous material to slip within the matrices and the plies to slip with respect to each other, to form said plastic material accurately and without wrinkling.

13. A method as recited in claim 6, in which the step of curing includes placing a flexible blanket over the female mold and the caul, and exerting said pressure on the caul includes applying a vacuum between the blanket and the female mold to urge the blanket against the caul and in turn cause the caul to exert said essentially uniform pressure on the material.

14. A method as recited in claim 13, in which the step of curing further includes placing into an autoclave the female mold with the formed material and caul therein, and heating said material inside the autoclave while exerting said pressure on the caul; and exerting said pressure on the caul further includes, while applying said vacuum, maintaining an elevated pressure inside the autoclave to urge the blanket toward and against the caul.

15. A method as recited in claim 11, in which the step of curing includes placing a flexible blanket over the female mold and the caul, and exerting said pressure on the caul includes applying a vacuum between the blanket and the female mold to urge the blanket against the caul and in turn cause the caul to exert said essentially uniform pressure on the material.

16. A method as recited in claim 6, in which the step of forming includes positioning the male mold with the male mold surface and the caul facing generally upwardly; placing the material on top of the caul; placing a flexible blanket adjacent to said material opposite the male mold; applying a slight vacuum between the blanket and the male mold, said slight vacuum being strong enough to hold the material in place on the caul but not strong enough to significantly bend the material; while applying said slight vacuum, rotating the male mold and the blanket with the caul and material therebetween about 180° to orient the male mold surface to face generally downwardly; after rotating the male mold, heating the material to reduce its viscosity; and then applying a stronger vacuum between the blanket and the male mold to pull the blanket toward the male mold and in turn form the heated material against the caul.

17. A method as recited in claim 16, further comprising, after forming the material and while continuing to apply said stronger vacuum, rotating the male mold and the blanket about 180° to orient the male mold surface to face generally upwardly, allowing the formed material to cool, and then moving the blanket away from the formed material to allow the female mold surface to be so placed.

18. A method as recited in claim 17, further comprising, after so placing the female mold surface and before so moving the male mold, positioning said blanket against the female mold opposite the male mold and applying a vacuum between the blanket and the female mold to urge the blanket against the female mold and in turn urge the female mold surface against the formed material, to facilitate so moving the male mold and leaving the caul and the formed material in the female mold.

* * * * *